May 13, 1930.  H. SCHMICK  1,758,088
METHOD OF AND MEANS FOR DETERMINING A CONSTITUENT
IN A MIXTURE OF SUBSTANCES
Filed Aug. 29, 1927
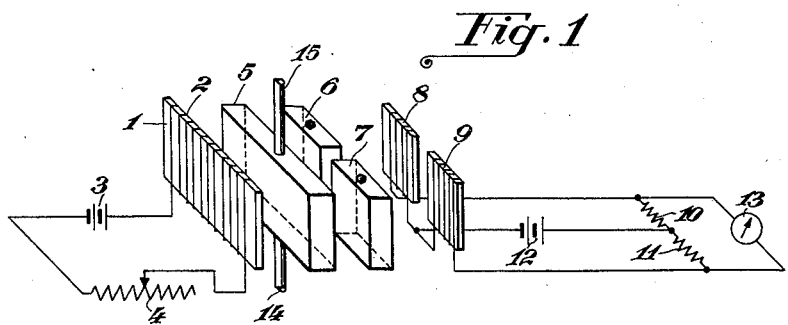
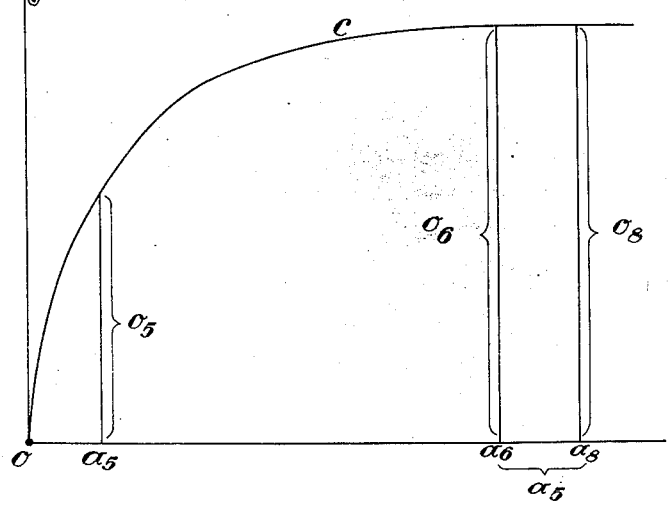
Inventor:
Hans Schmick
by Lytke, Kehlenbeck & Farley
Attorneys Patented May 13, 1930

1,758,088

UNITED STATES PATENT OFFICE

HANS SCHMICK, OF GREIFSWALD, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

METHOD OF AND MEANS FOR DETERMINING A CONSTITUENT IN A MIXTURE OF SUBSTANCES

Application filed August 29, 1927, Serial No. 216,066, and in Germany September 4, 1926.

The present invention relates to a method of and means for determining a constituent in a mixture of substances, more particularly of gases.

It is known to use the absorption, preferably of the infra red rays, by a gas mixture, for the determination of a constituent part of the gas. To that end, two bolometric resistances, the value of which is compared say in a Wheatstone bridge, are irradiated from one and the same source. Into the path of rays to one resistance, is inserted a chamber with the substance to be tested. If the gas to be determined is mixed with other gases, the influence of the other gases on the absorption can be eliminated by inserting into the path of rays to the two resistances, such a quantity of the added gases that the wave lengths absorbed by them will be practically completely extinguished, so that a difference in the irradiation of the two resistances, will be produced only by the gas to be determined in the mixture tested, which is inserted in front of one resistance.

It has been proposed to utilize a selective source of radiation, theoretically preferably an incandescent quantity of the gas to be determined. In that way there will be no production at all of rays of the wave lengths which are absorbed by the other gases added to the gas to be determined. In this general consideration, let us exclude the special case in which the spectrum bands or lines of some gases of the mixture intersect each other.

The two processes discussed above cannot be always carried out in practice completely. If the gas to be determined, for instance carbonic acid, is in a mixture of a large number of gases, it would be necessary when using the first process, to place into the path of rays, each of the remaining gases in a quantity sufficient for a complete absorption of the rays. On the other hand, the second process offers practical difficulties, say for the determination of carbonic acid, the difficulty of taking incandescent carbonic acid gas as a source of radiation. Both processes can be therefore carried into practical effect only in an approximate manner.

These drawbacks are eliminated by the arrangement according to the invention which makes it possible, when the gas to be determined is mixed with any desired number of foreign gases, to keep the apparatus exactly as simple as when determining unmixed gas. The main idea of the construction according to the invention is as follows:—

In front of each of the two irradiated bolometric resistances there is placed a chamber, one of which chambers can be theoretically assumed, as regards its influence on the radiation, as being perfectly free from gas, that is to say, it is filled with a practically non-absorbing gas such as air, whilst the other chamber is filled with the gas to be determined, for instance carbonic acid, to such a density as to insure in practice a complete absorption of the corresponding wave lengths. There will take place at first a considerable inequality of irradiation of the two bolometric resistances, which will be indicated by a deflection of the indicating instrument. Let it be assumed that this deflection is artificially brought back to zero. This could be done by adjustment on the measuring instrument, but also by a somewhat unsymmetrical position of the radiator. If now in the path of rays to the two resistances is inserted a chamber with the gas to be tested, for instance with a mixture containing carbonic acid, the bolometric resistance, in front of which is placed the chamber with the carbonic acid to be determined, will be influenced only by the added gases, and no longer by the gas to be determined, for the absorption of the corresponding radiation, that is to say, in the present example, of the carbonic acid radiation, was already practically complete for this resistance. The other bolometric resistance will be however affected by the absorption of the radiations of all the gases, which is constituted by two components:—(1) by the radiation of the added gases, to the same extent as the first resistance; the action of the added gases is however the same on both resistances so that its difference will not cause any deflection of the indicating instrument; (2) by the absorption of the radiation by the measuring gas contained in the mixture, that is to say carbonic acid. In the measuring instrument indicating the difference of the actions on the two resistances, there will be indicated therefore only the second component. Reference is to be had to the accompanying drawing, in which Fig. 1 is a perspective view of an apparatus embodying my invention and adapted for carrying out my improved method, and Fig. 2 is a diagram illustrating the absorption conditions.

Figure 1 shows diagrammatically, by way of example, a construction of the arrangement, in which for the sake of greater clearness the individual parts have been moved somewhat further apart than they are in actual practice. The radiator 1 is for instance a porcelain plate electrically heated by means of a wire 2 wound on the plate and supplied, through a regulating resistance 4, with current from a suitable source 3. The radiation after passing through the absorption vessels 5, 6, 7, strikes the two bolometric resistances 8 and 9 which form a Wheatstone bridge with the resistances 10 and 11. The source of current for this bridge is indicated at 12, the bridge galvanometer at 13. Of the three chambers 5, 6, 7, according to the invention the chamber 6 is filled with the measuring gas, say carbonic acid, the chamber 7 with a comparison gas of the weakest absorption, say air, and the chamber 5 with the mixture to be tested. The chamber 7 which has practically no absorbing action, has been provided because the proximity of the chambers 6 and 7 affects the temperature of the bolometric resistances 8 and 9, and this could produce a lack of symmetry that would disturb the measurement if only a one-sided chamber arrangement were adopted. The chambers could be made for instance of quartz throughout, or only at the portions which are struck by the radiation and the rest of metal, as quartz allows to pass very freely the practically effective wave lengths, the infra red being of chief importance. The chamber 5 is preferably not closed, but provided with inlets and outlets 14, 15 in order to enable the same chamber to be used for any desired number of measurements, and flowing gas to be employed as the gas to be tested.

In order to make the working of the arrangement clearer, an absorption curve $c$ for carbonic acid is shown in Figure 2. The abscissæ indicate the thickness of layers of the carbonic acid, referred to a given density, and the ordinates the absorption. To the chamber 6 corresponds the abscissa $a^6$ and the ordinate $o^6$ which is situated close to the maximum of the curve $c$. To the gas introduced into the chamber 5, corresponds the abscissa $a^5$ and the corresponding ordinate $o^5$. The total absorption at the bolometric resistance corresponds therefore to a thickness of layer $a^8$ when $a^8 = a^6 + a^5$. The absorption $o^8$ in the path of rays for the resistance 8, which takes place on the introduction of the test gas into the chamber 5 differs from the absorption $o^6$ when the test chamber 5 is empty, by a practically negligible amount. On the contrary, the absorption of the radiation for the resistance 9 with the test chamber 5 empty, is zero, whilst with the test chamber 5, filled, it is equal to $o^5$. The galvanometer 13 is deflected in accordance with this amount $o^5$.

The arrangement of the chamber 5 with the test gas in the path of rays for the two resistances 8, 9 has the advantage that no changes of absorption can be produced by dirt in the chamber, owing to the similar action on the two resistances. No zero point errors can be made. An error of measuring could be however caused by the temperature of the chambers 6 and 7 being influenced by the conductivity of the gases contained in them. For instance hydrogen, owing to its great conductivity, would have a cooling influence. In order to eliminate this drawback, the chamber 7 could be filled according to a further method of carrying out the invention, not with the absorbent comparison gas, but with the measuring gas itself, but diluted to such an extent that practically no perceptible absorption will take place. The heat conductivity of the gases in the two chambers will then be practically the same, as it is independent "within wide limits" of the density of the gas. Some other gas of the some heat conductivity as the measuring gas could also be introduced into the chamber 7, but care must be taken to see that the absorption bands or lines of this gas do not coincide in a disturbing manner with those of the measuring gas or of the other constituents of the test gas. Temperature fluctuations of the radiator would generally produce a shifting of the zero point on the galvanometer, as the absorption in the chamber 6 does not increase in accordance with the same law as the radiation. The temperature of the radiator could be however chosen in such a manner that the radiation allowed to pass by the chamber 6, as well as that allowed to pass by the chamber 7, would vary with the fourth power of the absolute temperature of the radiator. For carbonic acid for instance this is the case when the radiator temperature is between 400 and 800° C. It is preferable to use a mean value between these limits. At a temperature of about 600° C. the carbonic acid band of 4.5 will be situated close to the maximum of the energy in the emission spectrum. As is well known, the maximum itself increases with the fifth power of the radiator temperature. A wave length at a suitable small distance from the maximum, will then show a change approximately with the fourth power.

In the foregoing, carbonic acid was taken as an example for the measuring gas. The process could be however applied generally. As further gases, the determination of which in mixtures is of practical importance, may be mentioned for instance carbon monoxide and methane. The method could also be utilized for the measurement of the absorption of liquids and of solid bodies.

Having now particularly described and ascertained the nature of my said invention and in what manner the same is to be performed, I declare that what I claim is:—

1. An arrangement for the determination of a constituent in a mixture, comprising in combination at least two bolometric resistances, a source of radiation adapted to irradiate said resistances, a first body containing the mixture to be tested and located in the range of rays between said source and said resistances, a second body containing the constituent to be determined and inserted in the range of rays between said source and one of said two resistances and means for measuring the difference of irradiation of said two resistances.

2. An arrangement for the determination of a constituent in a mixture, comprising in combination at least two bolometric resistances, a source of radiation adapted to irradiate said resistances, a first body containing the mixture to be tested and located in the range of rays between said source and said resistances, a second body containing the constituent to be determined, and inserted in the range of rays between said source and one of said two resistances, a third body similar to said second body and containing a practically non-absorbing substance and inserted in the range of rays between said source and the other of said two resistances and means for measuring the difference of irradiation of said two resistances.

3. An arrangement for the determination of a constituent in a mixture, comprising in combination at least two bolometric resistances, a source of radiation adapted to irradiate said resistances, a first body containing the mixture to be tested and located in the range of rays between said source and said resistances, a second body containing the constituent to be determined, and inserted in the range of rays between said source and one of said two resistances, a third body similar to said second body and containing a practically non-absorbing substance, and of at least approximately the same heat conductivity as the constituent to be determined, said third body being arranged in the range of rays between said source and the other of said two resistances and means for measuring the difference of irradiation of the said resistances.

4. An arrangement for the determination of a constituent in a mixture, comprising in combination at least two bolometric resistances, a source of radiation adapted to irradiate said resistances, a first body containing the mixture to be tested and located in the range of rays between said source and said resistances, a second body containing the constituent to be determined, and inserted in the range of rays between said source and one of said two resistances, a third body containing the constituent to be determined, but diluted to such an extent that its absorption need not be taken into account, said third body being arranged in the range of rays between said source and the other of said resistances and means for measuring the difference of irradiation of said two resistances.

5. An arrangement for the determination of a constituent in a mixture, comprising in combination at least two bolometric resistances, a source of radiation adapted to irradiate said resistances, a first body containing the mixture to be tested and located in the range of rays between said source and said resistances, a second body containing the constituent to be determined, and inserted in the range of rays between said source and one of said two resistances, a third body containing a substance, the absorption bands of which do not intersect in a disturbing manner either with those of the constituent to be determined or with those of the admixtures, said third body being arranged in the range of rays between said source and the other of said resistances and means for measuring the difference or irradiation of said two resistances.

6. A process for determining a constituent of a mixture by means of absorption of radiation, which consists in heating the radiator to a temperature at which the quantity of heat allowed to pass through by that body which contains the constituent to be tested, varies with the fourth power of the absolute temperature of the radiator, for the purpose of avoiding fluctuations in the setting or position of the measuring means due to the fluctuations of the radiator temperature.

7. An arrangement for the determination of a constituent in a mixture, comprising in combination at least two bolometric resistances, a source of radiation adapted to irradiate said resistances, a first body containing the mixture to be tested and located in the range of rays between said source and said resistances, a second chamber of quartz containing the constituent to be determined, inserted in the range of rays between said source and one of said resistances and means for measuring the difference of irradiation of said resistances.

8. An arrangement for the determination of a constituent in a mixture, comprising in combination at least two bolometric resistances, a source of radiation adapted to irradiate said resistances, a first body containing the mixture to be tested and located in the range of rays between said source and said resistances, a second chamber of quartz containing the constituent to be determined, inserted in the range of rays between said source and one of said resistances, a third chamber of quartz similar to said second chamber and containing a practically non-absorbing substance, said third chamber being inserted in the range of rays between said source and the other of said resistances and means for measuring the difference of irradiation of said two resistances.

9. An arrangement for the determination of a constituent in a mixture, comprising in combination at least two bolometric resistances, a source of radiation adapted to irradiate said resistances, a first body containing the mixture to be tested and located in the range of rays between said source and said resistances, a second chamber located in the range of rays between said source and one of said two resistances and filled with the constituent to be determined, containing the same in such a thickness of layer and density that practically complete absorption of the effective wave length takes place, and means for measuring the differences of irradiation of said two resistances.

10. An arrangement for the determination of a constituent in a mixture, comprising in combination at least two bolometric resistances, a source of radiation adapted to irradiate said resistances, a first body containing the mixture to be tested and located in the range of rays between said source and said resistances, a second chamber located in the range of rays between said source and one of said two resistances and filled with the constituent to be determined, containing the same in such a thickness of layer and density that practically complete absorption of the effective wave length takes place, a third chamber filled with a practically non-absorbing substance and inserted in the range of rays between said source and the other of said two resistances and means for measuring the difference of irradiation of said two resistances.

In testimony whereof I affix my signature.
HANS SCHMICK.